(12) United States Patent
Giannoni et al.

(10) Patent No.: US 12,320,549 B2
(45) Date of Patent: Jun. 3, 2025

(54) TUBE WINDING FOR A GAS HEAT EXCHANGE CELL FOR A BOILER

(71) Applicant: CONDEVO S.P.A., Milan (IT)

(72) Inventors: Rocco Giannoni, Milan (IT); Giuseppe Bucci, Milan (IT)

(73) Assignee: Condevo S.P.A., Milan (IT)

( * ) Notice: Subject to any disclaimer, the term of this patent is extended or adjusted under 35 U.S.C. 154(b) by 440 days.

(21) Appl. No.: 17/952,484

(22) Filed: Sep. 26, 2022

(65) Prior Publication Data

US 2023/0108472 A1    Apr. 6, 2023

(30) Foreign Application Priority Data

Oct. 4, 2021    (IT) .......................... 102021000025346

(51) Int. Cl.
*F28F 1/02*    (2006.01)
*F24H 1/43*    (2022.01)
(Continued)

(52) U.S. Cl.
CPC ............... *F24H 1/43* (2013.01); *F28D 21/00* (2013.01); *F28F 1/04* (2013.01); *F28D 2021/0024* (2013.01)

(58) Field of Classification Search
CPC ..... F24H 1/43; F24H 1/16; F24H 8/00; F28D 7/024; F28D 2021/0024; F28D 7/0025;
(Continued)

(56) References Cited

U.S. PATENT DOCUMENTS 7,836,942 B2 * 11/2010 Cannas ..................... F24H 1/43
165/181
7,909,005 B2 * 3/2011 Le Mer .................. F28D 7/024
122/18.1
(Continued)

FOREIGN PATENT DOCUMENTS

CN      1455220 A  * 11/2003
CN    112178673 A  *  1/2021
(Continued)

OTHER PUBLICATIONS

Italian Search Report for related Italian Patent Application No. 2021000025346, Apr. 29, 2022, 7 pages.

Primary Examiner — Gregory A Wilson
(74) Attorney, Agent, or Firm — Armstrong Teasdale LLP (57) ABSTRACT

A tube profile (1), in particular for manufacturing a heat exchanger for a condensing boiler, wherein the cross-section (10) of the tube profile (1) comprises: a rectangular portion (20) having two greater sides (21, 22) parallel to each other and two smaller sides (31, 32) parallel to each other and orthogonal to the greater sides (21, 22), and an ogival portion (40) defined by a convex flat figure formed by a base (41) and two curved sides (42, 43) connected to each other in an apical zone (48) opposite to said base, wherein said base (41) coincides with a first side (31) of said two smaller sides (31, 32) of the rectangular portion (20), wherein said two curved sides (42,43) are symmetrical to an axis of symmetry (S-S) parallel to said greater sides (21, 22) and passing through the central points (33, 34) of said smaller sides (31, 32), wherein one end of each of said two curved sides (42, 43) joins to one end of a respective one of said two greater sides (21, 22)) in a first joining point (PH1), said each of said two curved sides (42, 43) being tangent to said respective one of said two greater sides (21, 22) in said first joining point (PH1), and wherein an overall dimension of
(Continued)

said ogival portion (HO) measured along said axis of symmetry (S-S) is greater than the length of said base (41); wherein the two greater sides (21, 22), a second side of said two smaller sides (32), and said two curved sides (42, 43), define the outer surfaces (50) of the walls of said tube profile (1).

17 Claims, 8 Drawing Sheets

(51) Int. Cl.
    *F28D 21/00*     (2006.01)
    *F28F 1/04*     (2006.01)

(58) Field of Classification Search
    CPC ... F28D 7/02; F28F 3/022; F28F 13/08; F28F 1/0006; F28F 1/025; F28F 1/02; F28F 1/04; F28F 2250/02
    See application file for complete search history.

(56) References Cited

U.S. PATENT DOCUMENTS

| | | | |
|---|---|---|---|
| 10,030,915 B2 * | 7/2018 | Alessandrini | F24H 1/43 |
| 11,041,659 B2 * | 6/2021 | De Nardis | F28D 7/024 |
| 2010/0044011 A1 | 2/2010 | Schleiter | |
| 2012/0055421 A1 | 3/2012 | Rausch | |
| 2017/0102164 A1 * | 4/2017 | Giannoni | F28F 9/20 |
| 2019/0277536 A1 * | 9/2019 | Giannoni | F24H 9/146 |

FOREIGN PATENT DOCUMENTS

| | | | | |
|---|---|---|---|---|
| EP | 745813 A2 * | 12/1996 | | F24H 1/43 |
| EP | 3633286 A1 | 4/2020 | | |
| WO | WO-2011064804 A2 * | 6/2011 | | F24H 1/43 |
| WO | WO-2015140713 A1 * | 9/2015 | | B23P 15/26 |
| WO | WO-2017125361 A1 * | 7/2017 | | F24H 1/40 |
| WO | WO-2019106567 A1 * | 6/2019 | | F24H 1/16 |

* cited by examiner

TUBE WINDING FOR A GAS HEAT EXCHANGE CELL FOR A BOILER

FIELD OF THE INVENTION

The present invention belongs to the technical field of heat exchangers and relates to a tube profile for manufacturing a heat exchanger, where the tube profile is adapted to cause a first fluid to flow therein and to be externally lapped by a second fluid, allowing a heat exchange between the first fluid and the second fluid through the tube profile. The first fluid is a liquid, generally water, for a heating or domestic water system, while the second fluid consists of the hot combustion fumes of a gas-air mixture. The invention further relates to a tube winding comprising the aforesaid tube profile, suitably shaped for a gas heat exchange cell for a boiler for environmental heating and/or for heating domestic water, e.g., for a heat exchange cell for a condensing boiler.

BACKGROUND ART

A condensing gas boiler for heating generally is a device in which a heat transfer fluid to be heated, generally water, flows by traveling through a heat exchanger, which is in contact with a flow of hot fumes transmitting heat to the heat transfer fluid.

The hot fumes are generated in a combustion chamber comprising a burner capable of producing heat from the combustion of a mixture of combustion air and gas.

A heat exchanger for a boiler, also referred to as a heat exchange cell, comprises a tube bundle in which the heat transfer fluid circulates, in particular water to be heated Such a tube bundle sometimes comprises tubes connected in series and/or parallel to one another, for example, substantially straight, or it comprises a tube winding, where the tube is wound as a solenoid or a helix according to a plurality of turns about a central axis forming an inner central chamber for said winding and wound by said winding, adapted to form a combustion chamber in use.

Such a tube winding is generally referred to as a "spiral" winding as the tube is wound according to a series of turns about a central axis.

If the exchanger comprises a tube winding, the latter is contained inside a container body extending about, and outside, said tube winding thus forming an outer chamber, which is radially interposed with respect to the central axis, between the tube winding and the casing, adapted to form a fume collection chamber in use.

During operation of the boiler, the heat transfer fluid, in particular water to be heated, flows inside the tube forming the tube winding, while a gas-air combustion is performed in the inner central combustion chamber, in which the flames of the burner is generated.

The resulting combustion fumes externally lap the tube forming the tube winding by flowing, according to a radial direction orthogonal to the central axis of the tube winding, from the combustion chamber to the fume collection chamber, passing through a calibrated passage, formed by an axial space, between each turn and the adjacent turns.

As the combustion fumes gradually flow from the combustion chamber to the fume collection chamber, they cool down, transferring heat to the tube winding, while the water traveling through the tube of the winding heats up.

When such fumes reach the fume collection chamber, if they cool down at a sufficiently low temperature, i.e., below dew temperature, they can generate a water steam condensation on the surfaces of the tube facing the fume collection chamber, which runs into a condensation collection zone and is then discharged outside.

Such a type of heat exchange cell is referred to as a condensing heat exchange cell and is used in a condensing boiler.

Likewise, after transferring the heat to the water, the combustion fumes are conveyed into a chimney and discharged into the atmosphere.

The current state of the art provides that the wound tube of the tube winding has a cross section being circular in shape or rectangular with radial edges or oval or rectangular having a portion exposed to the source of heat in the shape of a semi-circle.

The prior art also provides that there is a calibrated passage between one turn and the adjacent one, or between one tube and the adjacent one.

Tube cross-section shapes are known, which are symmetrical to a smaller axis of such a cross-section, having a portion facing the combustion chamber, or fume inlet portion, which is substantially equal to a fume outlet portion opposite to the fume inlet portion, seen according to a flow direction of such fumes.

The high heat exchange coefficient generated for the movement of the fumes in the passage between the turns allows reaching high levels of efficiency, but the level of pollutants generated and emitted is barely sufficient to respect current legal requirements and is elevated and beyond the limits with respect to the expectations of the future standards.

Therefore, the need is felt to reduce the amount of combustion-derived pollutants produced and emitted, but without penalizing the heat exchange efficiency and cost-effectiveness.

Furthermore, in order to improve sustainability, the need is felt to reduce the combustion pollutants, while avoiding increasing the mass of materials needed for the construction and energy to process them.

In conclusion, the need is felt to provide a tube profile for manufacturing a heat exchanger for a boiler, e.g., a condensing boiler, capable of reducing the production of combustion pollutants, as well as improving the thermal efficiency.

SUMMARY OF THE INVENTION

It is the object of the present invention to conceive and provide a tube profile, in particular for manufacturing a heat exchanger for a boiler, which allows meeting the aforesaid needs and overcoming, at least partially, the drawbacks claimed above with reference to the prior art.

In particular, it is a task of the present invention to provide a tube profile for a heat exchanger, which allows reducing the amount of combustion-derived pollutants produced and emitted when using the boiler, but without penalizing the heat exchange efficiency and cost-effectiveness.

It is another object of the present invention to provide a tube profile for a heat exchanger for a boiler, capable of reducing the combustion pollutants, while avoiding increasing the mass of materials needed for the construction and energy to process them.

It is a further object of the present invention to provide a tube heat exchanger, which allows meeting the aforesaid needs and overcoming, at least partially, the drawbacks claimed above with reference to the prior art.

Furthermore, it is an object of the present invention to provide a tube winding, in particular for a gas heat exchange cell, e.g., of the condensing type, for a boiler for heating an environment and/or domestic water, which allows meeting the aforesaid needs and overcoming, at least partially, the drawbacks claimed above with reference to the prior art.

It is another object of the present invention to provide a heat exchange cell for a boiler, e.g., for a condensing boiler, capable of reducing the production of combustion pollutants while improving the thermal efficiency.

These and further objects and advantages are achieved by a tube profile, as well as by a tube exchanger having said tube profile, and by a tube winding for a heat exchange cell for a boiler for heating an environment and/or domestic water, as well as by a condensing heat exchange cell having such a tube winding, in accordance with the independent claims.

According to a general embodiment of the present invention, a tube profile, e.g., for manufacturing a heat exchanger for a boiler, for example for a condensing boiler, has the cross-section thereof comprising a rectangular portion having two greater sides parallel to each other and two smaller sides parallel to each other and orthogonal to the greater sides, and an ogival portion with a base and two curved sides, where said base coincides with a first side of said two smaller sides of the rectangular portion, and where each of said two curved sides continuously joins to one end of a respective one of said two greater sides in a first joining point, each of said two curved sides being tangent to said respective one of said two greater sides in said first joining point, where the two greater sides, a second side of said two smaller sides, and said two curved sides define the outer surfaces of the walls of said tube profile.

When such a tube profile is used in a heat exchanger for a boiler, a flow of hot fumes having a predetermined direction and orientation laps the outer lateral surface of the tube according to a direction from the ogival portion to the rectangular portion.

It was found that the most relevant heat exchange develops on the tube profile part facing the source of heat, thus facing in the opposite direction to that of the flow of the hot fumes.

It was found that the amount of heat exchanged through the outer surface of the ogival portion is greater than that exchanged through the remaining outer surface of the tube profile.

This is determined by the fact that such a zone is faced to the flame and it is in contact with the hottest fumes, these being at temperatures between 1000° C. and 1500° C.

Since the inner surface of the tube profile into which the heat-transfer fluid flows, in particular water, is at relatively low temperatures, generally between 30° C. and 90° C., there is a great difference in temperature which, together with the high speeds of the heat-transfer fluid flow, favors the heat exchange.

It has been verified that, in the ogival zone, the heat exchange is by radiation and convection, along the greater sides of the rectangular portion the heat exchange occurs only by convection, while along the smaller outer side of the rectangular portion, the heat exchange occurs by convection at a low speed and of a very small amount with respect to the heat exchange on the other surfaces.

It can be concluded that, in order to optimize the heat exchange at a constant quantity of material which is used, it is important to maximize the outer surface of the tube profile in the zone comprising the ogival portion and the greater sides of the rectangular portion, while limiting the size of the smaller side of the rectangular portion opposite to the ogival portion.

The geometry of the claimed cross-section meets this requirement, therefore it allows optimizing the heat exchange at a constant quantity of material which is used.

Furthermore, advantageously, the rectangular portion of the cross-section of the tube profile allows having a hot fume flow speed along the greater sides of the rectangular portion of such a section which is uniform and on average higher than that along the ogival portion, along which the curve of the hot fume speed varies gradually, reducing the speed peaks.

It was found that the shape of the cross-section of the tube profile according to the invention, if the pollutant level is desired to be kept more or less equal to that of a profile according to the prior art, allows reducing the air index of the combustion, resulting in further increasing the efficiency with respect to the traditional profile. In fact, it is known that a reduction in the air index corresponds to a better thermal efficiency but, on the other hand, to an increased production of pollutants, which has represented an obstacle to increasing the efficiency for traditional profiles.

Figure 9:
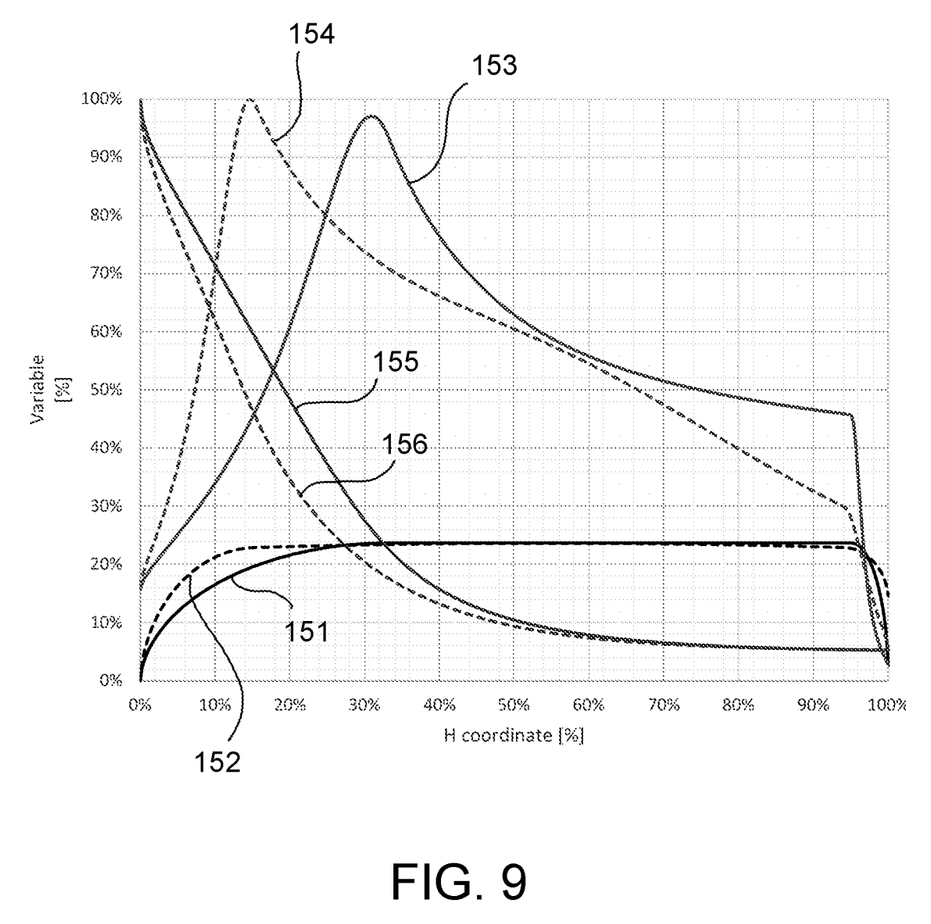
FIG. 9 shows a comparative graph of the trend of the temperatures and speeds in the case of the tube profile according to the invention compared with the same parameters of a known tube profile, the cross-section of which has a portion adapted to be exposed to the fumes having a semi-circular shape.

In order to understand the advantages of the shape of the cross-section of the tube profile according to the invention, comprising a portion exposed to the fumes having an ogival shape and a rectangular portion which, together, form a "bullet"-shaped cross-section, with respect to a traditional shape of a tube profile used in this field, in which the cross-section has a portion exposed to the fumes having the shape of a semi-circle, FIG. 9 shows a comparison of the speed and temperature trends of the bullet-shaped cross-section according to the invention with respect to a traditional cross-section having the portion exposed to the fumes in the shape of a semi-circle, where the outer perimeter of the bullet-shaped cross-section is equal to the outer perimeter of the cross-section of the profile having the portion exposed to the fumes in the shape of a semi-circle.

In particular, the continuous line 151 and the dashed line 152 represent an upper half of a bullet-shaped cross-section according to the invention with respect to the axis of symmetry S-S, and a corresponding upper half of a traditional cross-section having the portion exposed to the fumes in a shape of semi-circle, respectively.

Furthermore, the continuous line 153 represents the trend of the fume speed along the outer surface of the bullet-shaped cross-section according to the invention, and the dashed line 154 represents the trend of the fume speed along the outer surface of a traditional cross-section having the portion exposed to the fumes in a shape of semi-circle.

Finally, the continuous line 155 represents the trend of the fume temperature along the outer surface of the bullet-shaped cross-section according to the invention, and the dashed line 156 represents the trend of the fume temperature along the outer surface of the traditional cross-section having the portion exposed to the fumes in the shape of a semi-circle.

Therefore, it can be inferred that the geometry of the cross-section of the bullet-shaped tube profile according to the invention has a more gradual trend of the fume speed than the traditional tube, which has instead a more marked speed peak.

Advantageously, this allows the tube profile according to the invention to complete the combustion reaction and thus reduce the level of pollutants with respect to a tube cross-section having the portion exposed to the fumes in the shape of a semi-circle.

On the contrary, the traditional tube profile, e.g., having the portion exposed to the fumes with a semi-circular shape, having a relatively high speed peak, gives rise to the formation of pollutants, in particular carbon monoxide CO.

By observing the temperature trends of the graph in FIG. 9, it can also be inferred that the shape of the cross-section of the tube profile according to the invention gives rise to a high thermal efficiency with respect to that of a known tube profile having the portion of the cross-section exposed to the fumes in the shape of a semi-circle.

Another advantage produced by the geometry of the cross-section of the tube profile according to the invention is the reduction of the potential effects of erosion of the outer surface of the tube profile. In fact, in this respect, it has been found that the particular shape of the cross-section of the tube profile according to the invention reduces the potential risk of erosion of the metal of the tube at local speed peaks caused by the concurrence of high speed and high temperature, which are reduced and beneficial for said profile.

The cross-section of the tube profile according to the invention, comprising a rectangular portion and an ogival portion, allows increasing the passage sections of the fumes between one tube profile and another tube profile, which are mutually adjacent along the ogival portion with respect to a tube having a circular cross-section with equal perimeter.

At the same time, the cross-section of the tube profile according to the invention allows extending the passages of the fumes between one tube profile and another tube profile, which are mutually adjacent along the greater sides of the rectangular portion, and allows reducing the size of the smaller side of the rectangular section opposite to the ogival portion, where the heat exchange is very low, resulting in the aforesaid advantages.

Further objects, solutions, and advantages are present in the embodiments described below and claimed in the dependent claims.

BRIEF DESCRIPTION OF THE DRAWINGS

The invention will be illustrated below by describing some embodiments thereof by way of non-limiting example, with reference to the accompanying drawings, in which.

DESCRIPTION OF PREFERRED EMBODIMENTS

With reference to the figures, a tube profile according to the invention is globally indicated by reference numeral 1.

Furthermore, with reference to the figures, a tube winding formed with the tube profile 1 according to the invention is globally indicated by reference numeral 200.

Furthermore, with reference to the figures, a gas condensing heat exchange cell containing the tube winding 200 is generally indicated by reference numeral 300.

With reference to the figures, an "axial direction" will be understood as a Z direction, coinciding with, or parallel to, the central winding axis C-C, and a radial direction R will be understood as a direction orthogonal to the central winding axis C-C.

Furthermore, a "development axis" F of the tube profile is understood as a line extending along the central axis of the tube.

A "cross-section" of the tube profile is as a section made by means of a sectional plane orthogonal to the central axis of the tube.

A "tube profile" is understood as a tubular elongated element.

The tube profile 1 is particularly adapted to manufacture a heat exchanger for a condensing boiler.

Figure 7:
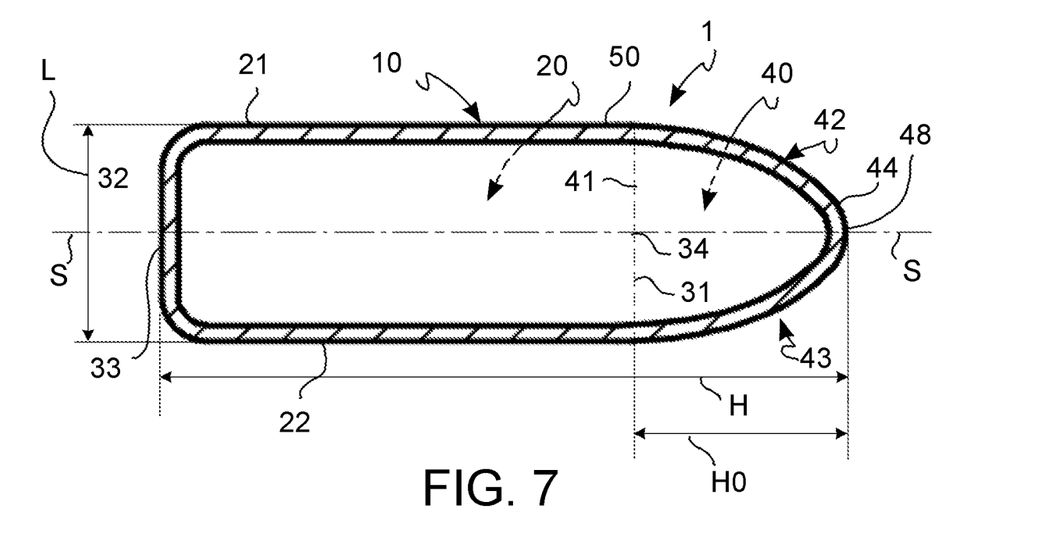
FIG. 7 shows the cross-section of a tube profile according to the invention.

The cross-section 10 of the tube profile 1 comprises a rectangular portion 20 having two greater sides 21, 22 parallel to each other and two smaller sides 31, 32 parallel to each other and orthogonal to the greater sides 21, 22, and an ogival portion 40 defined by a convex flat figure formed by a base 41 and two curved sides 42, 43 connected to each other in an apical zone 48 opposite to said base 41.

According to an embodiment, the cross-section 10 of the tube profile 1 consists of said rectangular portion 20 and said ogival portion 40.

The base 41 coincides with a first side 31 of said two smaller sides 31, 32 of the rectangular portion 20, therefore it has the same length as the first smaller side 31 of the two smaller sides of the rectangular portion.

The two curved sides 42, 43 are symmetrical to an axis of symmetry S-S parallel to the greater sides 21, 22 of the rectangular portion and passing through the central points 33, 34 of said smaller sides 31, 32 of the rectangular portion.

Each of said two curved sides 42, 43 extends continuously from, and tangent to a respective one of said two greater sides 21, 22.

One end of each of said two curved sides 42, 43 joins to one end of a respective one of said two greater sides 21, 22 in a first joining point PH1, each of said two curved sides 42, 43 being tangent to said respective one of said two greater sides 21, 22 in said first joining point PH1.

The overall size of said ogival portion HO, equal to the difference between the overall cross-section width H and the width H1 of the rectangular portion measured along the axis of symmetry S-S, is greater than the length of said base 41, thus greater than the length of the first smaller side 31 of the rectangular portion 20.

Figure 8:
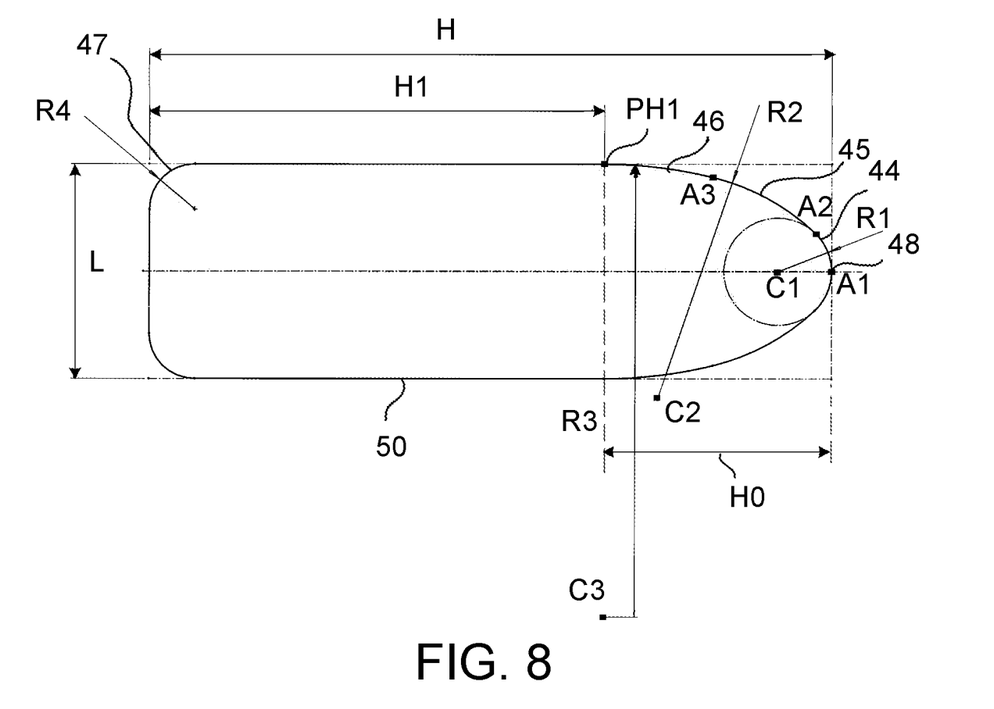
FIG. 8 shows a cross-section of the outer surface of the tube profile shown in FIG. 7.

The two greater sides 21, 22, a second side of said two smaller sides 32, and said two curved sides 42, 43 define the outer surfaces 50 of the walls of said tube profile 1.

The tube profile is made of a material configured to be used in a heat exchanger, therefore such a material has a high thermal conductivity, e.g., it is made of metal, e.g., of aluminum or an alloy thereof, e.g., of steel.

The tube profile 1, configured to be internally crossed by a fluid to be heated and to be externally lapped by a heating fluid having a higher temperature than the fluid to be heated, is arranged with the ogival portion 40 thereof facing in the flow direction of the heating fluid, but in the opposite direction to the direction of such a flow, while the rectangular portion is arranged oriented according to the direction of the flow.

Therefore, the ogival portion corresponds to a "hot side" of the tube profile, while the rectangular portion corresponds to a "cold side" of the tube profile.

In other words, the ogival portion is configured to face a hot source, e.g., a combustion chamber, in countercurrent to the flow direction of the hot fumes from the hot source or the combustion chamber. That is, the flow of hot fumes first hits the ogival portion and then the remaining part of the cross-section.

In other words, since the ogival portion faces the opposite direction to the advancing direction of the fumes, and since the fumes are introduced into the passages between one tube profile and another adjacent one, meeting first the ogival portion and then the rectangular one, the ogival portion can be seen as a fume inlet portion, and the rectangular portion can be seen as a fume outlet portion.

The cross-section 10 of the tube profile 1 has a symmetrical shape with respect to an axis of symmetry S-S parallel to said greater sides 21, 22 and passing through the central points 33, 34 of said smaller sides 31, 32.

Furthermore, the cross-section 10 of the tube profile 1 preferably has a non-symmetrical shape to an axis orthogonal to the axis of symmetry S-S.

In other words, the cross-section of the fume inlet portion is different from the cross-section of the fume outlet portion.

According to a preferred embodiment, the cross-section 10 of the tube profile 1 consists of only one rectangular portion 20 and only one ogival portion 40, having the opposite end of the cross-section with respect to the ogival portion 40, being flat or substantially flat in shape.

Alternatively, according to an embodiment, the opposite end of the cross-section with respect to the ogival portion 40, or the second side 32 of said two smaller sides 31, 32 of the rectangular portion, can have a slight curvature outwards, preferably with a high value of radius of curvature, e.g., with radius of curvature being greater than the overall cross-section width value H or greater than double the value H of the overall cross-section width, for example.

In this regard, it has been found that the heat exchange efficiency value between the first and second fluids through the tube profile 1 according to the invention is greater than any cross-section shape being symmetrical to an axis orthogonal to the axis of symmetry S-S.

According to an embodiment, the cross-section 10 has an overall cross-section width value H measured along a direction parallel to said two greater sides 21, 22 and an overall cross-section height value L measured along a direction orthogonal to said two greater sides 21, 22, where the overall cross-section width value H is greater than said overall cross-section height value L.

According to an embodiment, the overall cross-section height value L is about ⅓ of the overall cross-section width value H.

According to an embodiment, the size of the ogival portion 40 measured in a direction parallel to the greater sides 21, 22 of the rectangular portion is about ⅓ of the overall cross-section width value H.

According to an embodiment, the value of the width H1 of the rectangular portion measured along the axis of symmetry S-S is substantially equal to the value of the radius of curvature R3 of each of said two curved sides 42, 43 in said joining point PH1.

According to an embodiment, the two curved sides 42, 43 of said ogival portion are connected to each other by means of an apex connection arc of circumference 44 having a first preset value of apex radius of curvature R1, for example the apex connection arc of circumference 44 is tangent to the two curved sides 42, 43 of said ogival portion 40.

According to an embodiment each curved side 42, 43 of said ogival portion 40 comprises at least two successive arcs of a circle 45, 46, each having a respective preset constant value of radius of curvature R2, R3, and where each arc of circumference 45, 46 is arranged so as to have said respective preset constant value of radius of curvature R2, R3 in an increasing order proceeding in a direction from said ogival portion 40 towards said rectangular portion 10, said successive arcs of circumference 45, 46 having centers of curvature C2, C3 not mutually coinciding, and where each arc of circumference of said at least two successive arcs of circumference 45, 46 is tangent to the adjacent arcs of circumference.

According to an embodiment, the apex radius of curvature value R1 is smaller than the smallest of the values of radius of curvature of said at least two successive arcs of circumference 45, 46.

According to an embodiment, each curved side 42, 43 of said ogival portion 40 is formed by a second arc of circumference 45 having a second preset value of radius of curvature R2 and by a third arc of circumference 46 having a third value of radius of curvature R3, where the third arc of circumference 46 is connected and tangent to one of said greater sides 21, 22, and the second arc of circumference 45 is connected and tangent to said third arc of circumference 45, and where the second value of radius of curvature R2 is less than the third value of radius of curvature R3.

According to an embodiment, the apex radius of curvature value R1 is smaller than the second radius of curvature value R2.

According to an embodiment, the apex radius of curvature value R1, the second radius of curvature value R2, and the third radius of curvature value R3 have the following values:

$$R_1 = \frac{L}{4}$$

$$R_2 = \frac{H}{\beta}$$

$$R_3 = \frac{\beta - 1}{\beta} \cdot H$$

where
L=overall cross-section height value;
H=overall cross-section width value;
β=constant.

According to another embodiment, each curved side 42, 43 of said ogival portion 40 has a radius of curvature of gradually decreasing value proceeding from said base 41 towards said apical zone 48.

For example, each curved side 42, 43 of said ogival portion 40 has a radius of curvature of gradually decreasing value proceeding from said base 41 towards said apical zone 48 according to an elliptical function.

In other words, the two curved sides 42, 43 of the ogival portion 40 globally form half of an ellipse, where the smaller axis of the ellipse coincides with the base of the ogival portion 41, and where the greater axis of the ellipse lies on the axis of symmetry S-S.

The center of the ellipse is arranged in the central point 34 of the first smaller side 31 of the rectangular portion.

According to an embodiment, each of the two greater sides 21, 22 of the rectangular portion 20 is connected to the second side 32 of said two smaller sides of said rectangular portion 20 by means of a respective end arc of circumference 47 having a preset end radius of curvature value R4.

According to an embodiment, said end radius of $$R_4 \leq \frac{\beta - 1}{\beta} \cdot \frac{H}{10}$$

curvature value R4 has the following value:
where:
H=overall cross-section width value;
β=constant.

According to an embodiment, said end radius of curvature value R4 is less than, or equal to, ½ of the overall cross-section height value L.

According to an embodiment, the value of the aforesaid constant β is given by the relationship:

2.5≤β≤4

Figure 6:
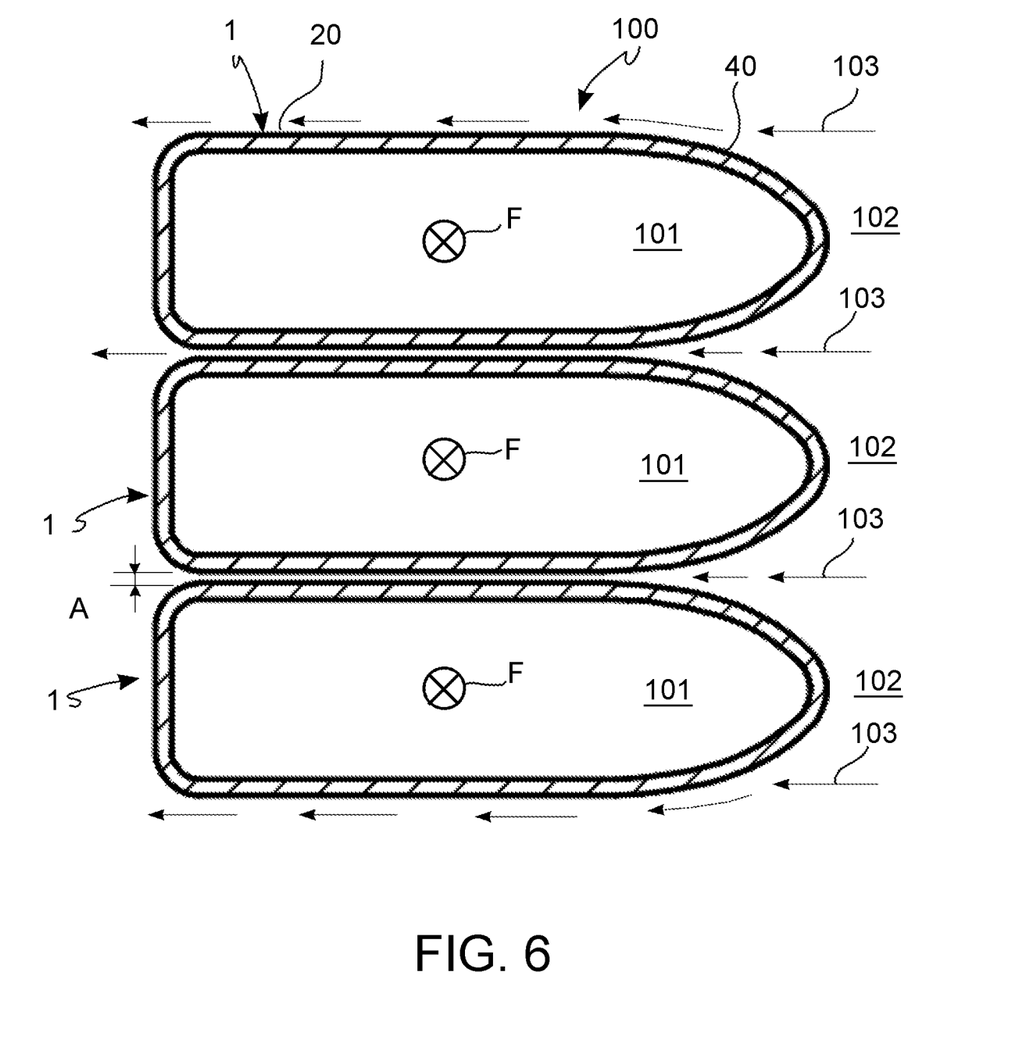
FIG. 6 shows a sectional view of three elements of the heat exchanger according to the invention or of three adjacent turns of the tube winding according to the invention.

According to another aspect of the invention, the aforesaid objects and advantages are achieved by a tube heat exchanger 100, comprising at least one tube profile 1 with any of the features described above, where the tube profile 1 is adapted to be internally crossed by a first fluid 101 to be heated, and is adapted to be externally lapped by a second heating fluid 102 according to a predetermined flow direction and orientation 103, where said predetermined flow direction 103 is orthogonal to an extension direction F-F of the tube profile, where said rectangular portion 20 of the cross-section 10 of said tube profile 1 is arranged with the two greater sides 21, 22 thereof along said predetermined flow direction 103, and with said ogival portion 40 facing an opposite direction to said predetermined flow direction 103.

Figure 4:
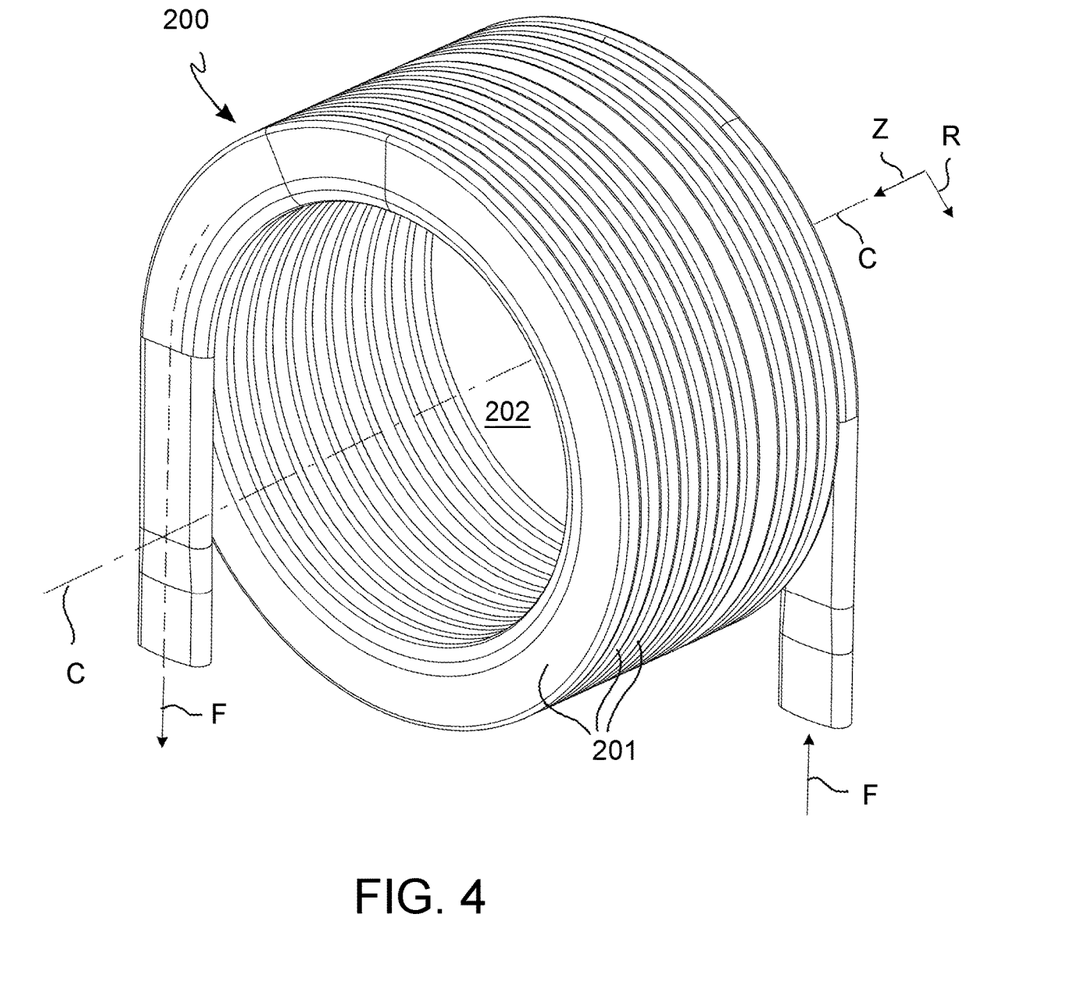
FIG. 4 shows an angled isometric view of the tube winding according to the invention.
Figure 5:
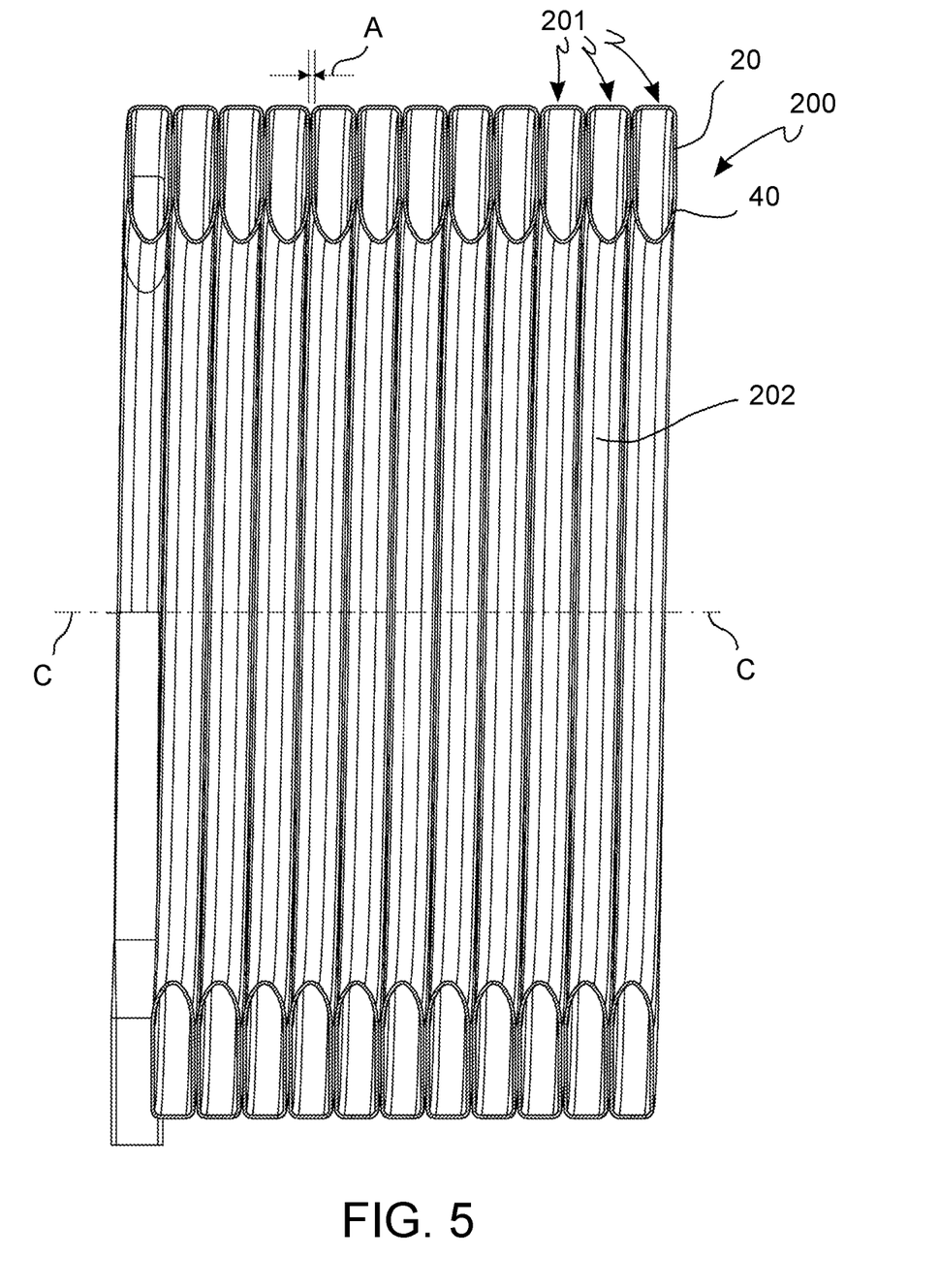
FIG. 5 shows a sectional view of the tube winding according to the invention, by means of a sectional plane comprising the central axis of the winding.

According to another aspect of the present invention, the aforesaid objects and advantages are achieved by a tube winding 200, in particular for a gas condensing heat exchange cell 300 for a boiler for heating an environment.

The aforesaid tube winding 200 is formed by a tube profile 1 having any of the features described above, wound according to a plurality of turns 201 about a central winding axis C-C.

The turns 201 of said plurality are spaced apart from one another according to a direction parallel to the central axis C-C forming calibrated axial passages (A) therebetween, adapted to be crossed, in a radial direction R with respect to said central axis C-C, from the central axis towards C-C the exterior of the tube winding.

The tube winding 200 defines a central chamber 202 radially inside said at least one tube winding 200 and coaxial to said central axis C-C, defining a combustion chamber 202.

The combustion chamber 202 is laterally delimited by the surfaces of said turns 201, corresponding to the ogival portion 40 of each of them.

The rectangular portion 20 of the cross-section 10 of said tube profile 1 is arranged with the two greater sides 21, 22 thereof lying on planes orthogonal to the central axis C-C of the tube winding 200, and the ogival portion 40 of the cross-section 10 of said tube profile 1 faces said central axis C-C.

Figure 1:
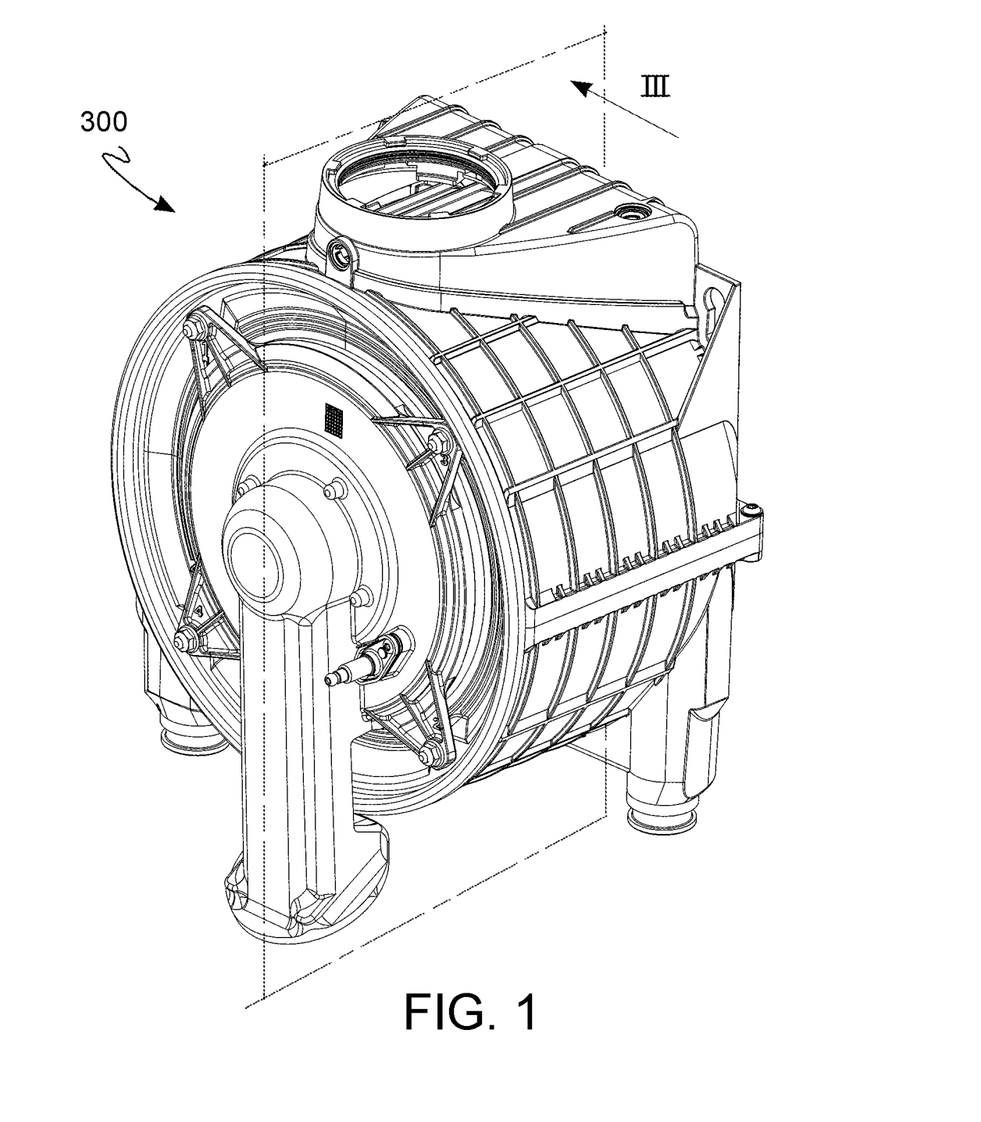
FIG. 1 illustrates an angled isometric view of a heat exchange cell comprising a tube winding according to the invention, in an assembled configuration.
Figure 2:
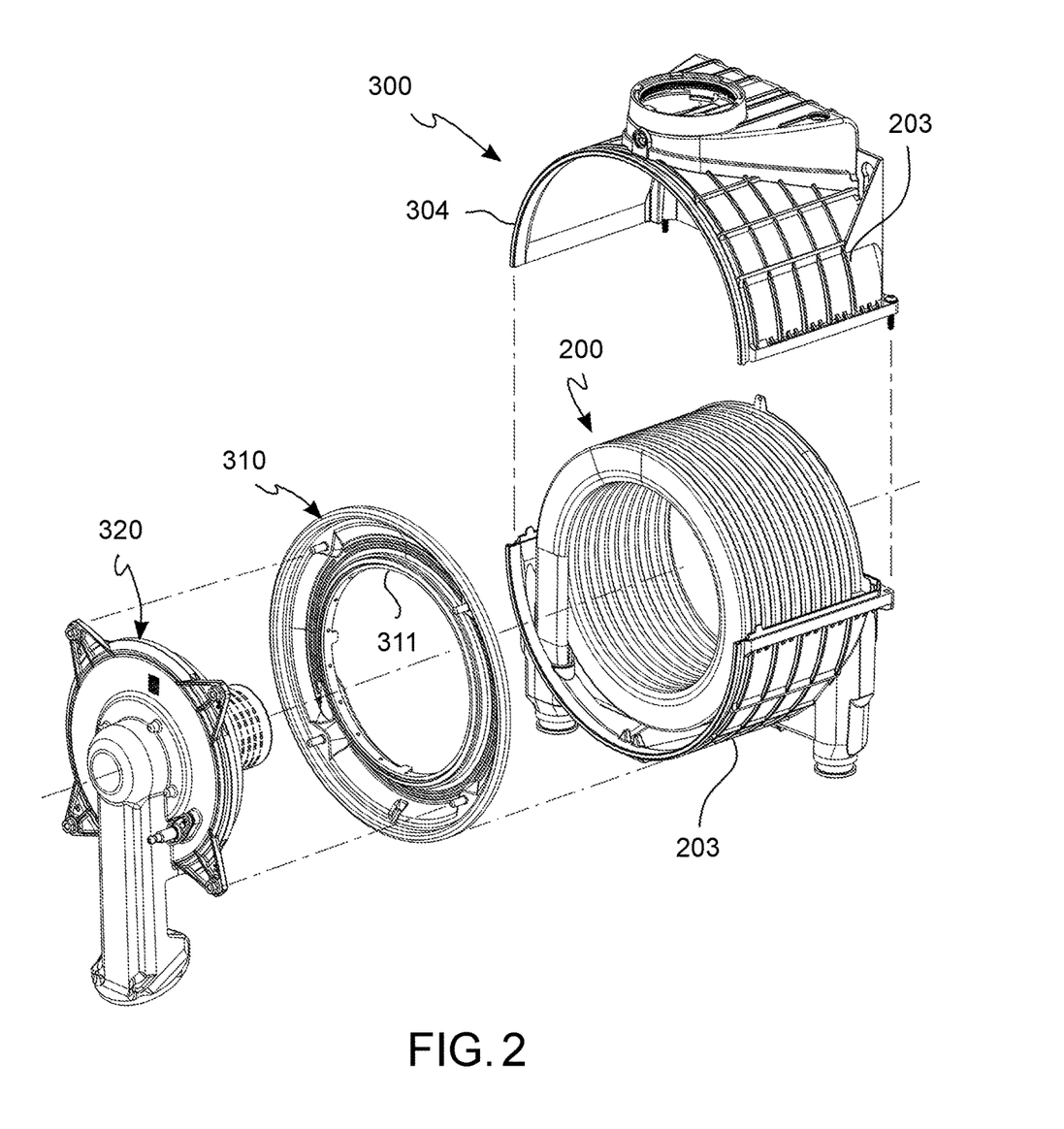
FIG. 2 illustrates an exploded view of the heat exchange cell in FIG. 1, where the assembly position of a tube winding according to the invention is visible.
Figure 3:
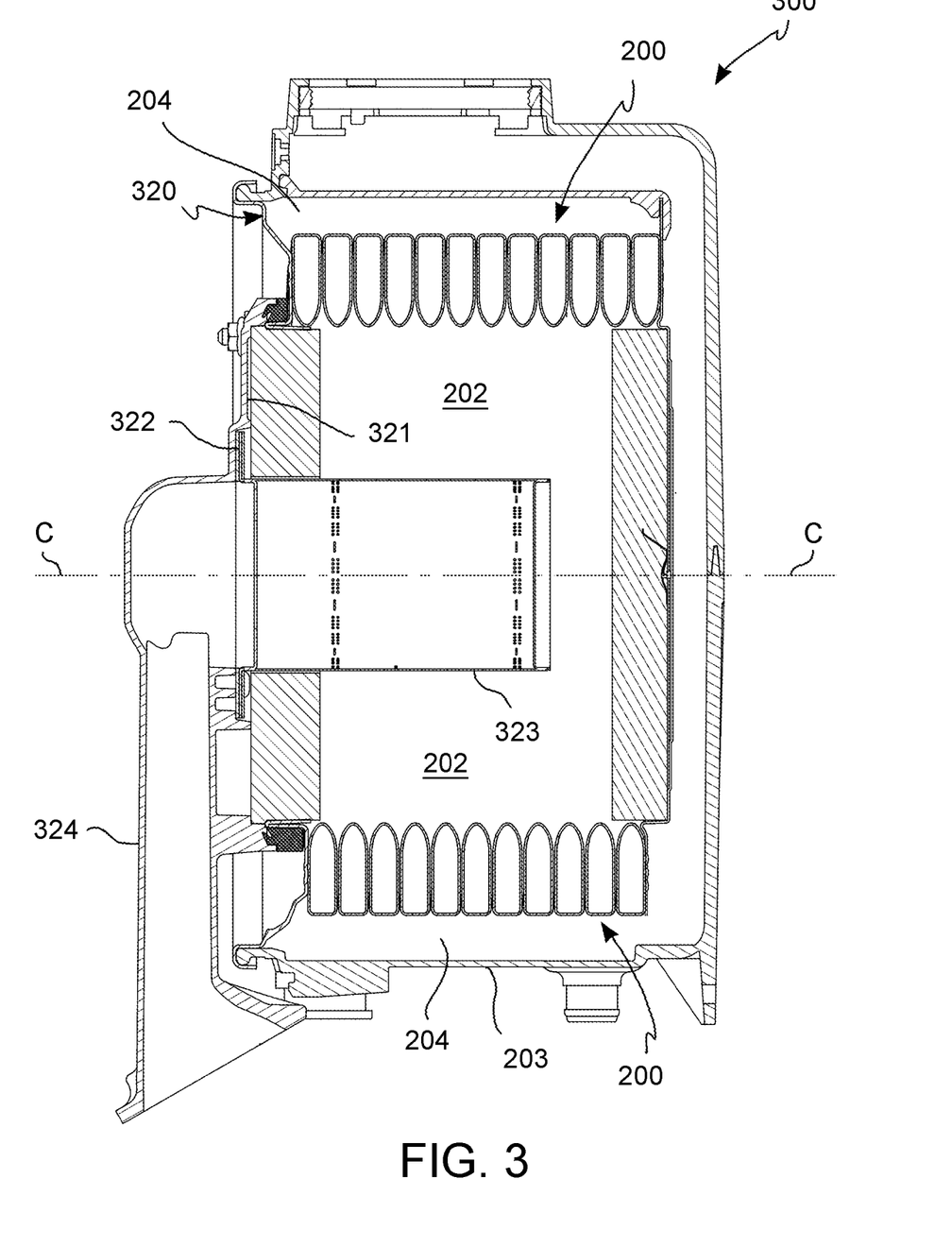
FIG. 3 shows a sectional view of the heat exchange cell in FIG. 1, by means of a sectional plane III containing the central axis of the winding.

According to another aspect of the present invention, the aforesaid objects and advantages are achieved by a gas condensing heat exchange cell 300 for a boiler for heating an environment, comprising at least one tube winding 200, as described above, adapted to be crossed by a heat transfer fluid.

Furthermore, the heat exchange cell comprises a container body 203 containing said at least one tube winding 200 therein, where the container body 203 is arranged about, and outside, said at least one tube winding 200, forming a fume collection chamber 204 arranged radially outside said at least one tube winding 200 and radially interposed between said tube winding 200 and said container body 203 so that the fumes of the combustion which takes place in the combustion chamber 202 can flow from the combustion chamber 202 to the fume collection chamber 204 through said axial space A between said turns 201, lapping said at least one tube winding 200 and transferring an amount of heat to said heat transfer fluid.

The second smaller sides 32 of the rectangular portions 20 of the cross-sections 10 define a radially internal lateral surface of said fume collection chamber 204.

Preferably, the heat exchange cell 300 comprises a closing flange 310, preferably made from a printed sheet, configured to close a front opening 304 of the container body 203.

The closing flange 310 has a central flange opening 311 configured to allow access to the interior of the combustion chamber 202 for carrying out maintenance.

The heat exchange cell 300 comprises a closing door 320 adapted to be removably mounted to said closing flange 310 for closing said central flange opening 311 in use.

The closing door 320 supports, on an inner face 321 thereof, a gas burner 323 so that it is arranged, in use, inside the combustion chamber 202 and, on the outer face 322 thereof, a feeding sleeve 324 for feeding a combustible gas-air mixture to said burner 323.

FIG. 9 illustrates a comparison of the speed and temperature trends of the bullet-shaped cross-section according to the invention with respect to a traditional cross-section having the portion exposed to the fumes in the shape of a semi-circle, where the outer perimeter of the bullet-shaped cross-section is equal to the outer perimeter of the cross-section of the profile having the portion exposed to the fumes in the shape of a semi-circle.

In particular, the continuous line 151 and the dashed line 152 represent an upper half of a bullet-shaped cross section according to the invention, and an upper half of a traditional cross-section having the portion exposed to the fumes shaped as a semi-circle, respectively.

Furthermore, the continuous line 153 represents the trend of the fume speed along the outer surface of the bullet-shaped cross-section according to the invention, and the dashed line 154 represents the trend of the fume speed along the outer surface of a traditional tube cross-section having the portion exposed to the fumes shaped as a semi-circle.

Finally, the continuous line 155 represents the trend of the fume temperature along the outer surface of the bullet-shaped cross-section according to the invention, and the dashed line 156 represents the trend of the fume temperature along the outer surface of the traditional cross-section having the portion exposed to the fumes shaped as a semi-circle.

Those skilled in the art may make changes and adaptations to the embodiments of the device described above, or replace elements with others which are functionally equivalent in order to meet contingent needs, without departing from the scope of the following claims. Each of the features described as belonging to a possible embodiment can be implemented irrespective of the other embodiments described.

All the features described herein may be combined in any combination, except for the combinations in which at least some of such features mutually exclude one another.

The invention claimed is:

1. A tube profile, for manufacturing a heat exchanger for a boiler, wherein a cross-section of the tube profile comprises:
a rectangular portion having two greater sides parallel to each other and two smaller sides parallel to each other and orthogonal to the greater sides, and
an ogival portion defined by a convex flat figure formed by a base and two curved sides connected to each other in an apical zone opposite to said base, wherein said base coincides with a first side of said two smaller sides of the rectangular portion, wherein said two curved sides are symmetrical to an axis of symmetry) parallel to said greater sides and passing through central points of said smaller sides, wherein one end of each of said two curved sides joins with continuity to one end of a respective one of said two greater sides in a joining point, said each of said two curved sides being tangent to said respective one of said two greater sides in said joining point, and wherein an overall dimension of said ogival portion measured along said axis of symmetry is greater than the length of said base;
wherein the two greater sides, a second side of said two smaller sides, and said two curved sides define the outer surfaces of the walls of said tube profile.

2. A tube profile according to claim 1, wherein said cross-section has a symmetrical shape with respect to said axis of symmetry.

3. A tube profile according to claim 1, wherein said cross-section has an overall cross-section width value measured along a direction parallel to said two greater sides and an overall cross-section height value measured along a direction orthogonal to said two greater sides, wherein the overall cross-section width value is greater than said overall cross-section height value.

4. A tube profile (1) according to claim 1, wherein the width value of the rectangular portion measured along the axis of symmetry is substantially equal to the value of the radius of curvature of each of said two curved sides in said joining point.

5. A tube profile according to claim 1, wherein said two curved sides of said ogival portion are connected to each other by means of an apex connection arc of circumference having a first preset value of apex radius of curvature.

6. A tube profile according to claim 5, wherein each curved side of said ogival portion is formed by a second arc of circumference having a second preset value of radius of curvature and by a third arc of circumference having a third value of radius of curvature, wherein the third arc of circumference is connected and tangent to one of said two greater sides, and the second arc of circumference is connected and tangent to said third arc of circumference, and wherein the second value of radius of curvature is less than the third value of radius of curvature.

7. A tube profile according to claim 6, wherein the value of apex radius of curvature is less than the second value of radius of curvature.

8. A tube profile according to claim 7, wherein said values of apex radius of curvature, second value of radius of curvature and third value of radius of curvature have the following values:

$$R_1 = \frac{L}{4}$$

$$R_2 = \frac{H}{\beta}$$

$$R_3 = \frac{\beta-1}{\beta} \cdot H$$

where
L=overall cross-section height value measured along a direction orthogonal to said two greater sides;
H=overall cross-section width value measured along a direction parallel to said two greater sides;
β=constant.

9. A tube profile according to claim 8, wherein:

2.5≤β≤4.

10. A tube profile according to claim 1, wherein each curved side of said ogival portion comprises at least two successive arcs of circumference, each having a respective preset constant value of radius of curvature, and wherein each arc of circumference is arranged so as to have said respective preset constant value of radius of curvature in an increasing order proceeding in a direction from said ogival portion towards said rectangular portion, said successive arcs of circumference having centers of curvature not mutually coinciding, and wherein each arc of circumference of said at least two successive arcs of circumference is tangent to the adjacent arcs of circumference.

11. A tube profile according to claim 1, wherein each of the two greater sides is connected to the second side of said two smaller sides of said rectangular portion by means of a respective end arc of circumference having a preset value of end radius of curvature.

12. A tube profile according to claim 11, wherein said value of end radius of curvature has the following value:

$$R_4 \leq \frac{\beta-1}{\beta} \cdot \frac{H}{10}$$

where:
H=overall cross-section width value measured along a direction parallel to said two greater sides;
β=constant.

13. A tube profile according to claim 12, wherein said value of end radius of curvature is less than or equal to ½ of the overall cross-section height value.

14. A tube profile according to claim 1, wherein each curved side of said ogival portion has a radius of curvature of gradually decreasing value, proceeding from said base towards said apical zone, and/or wherein said two curved sides of the ogival portion altogether form one half of an ellipse, wherein the smaller axis of the ellipse coincides with the base of the ogival portion, and wherein the greater axis of the ellipse lies on the axis of symmetry.

15. A tube heat exchanger, comprising at least one tube profile according to claim 1, said tube profile being adapted to be passed through internally by a first fluid to be heated, and adapted to be lapped externally by a second heating fluid according to predetermined flow direction and orientation, wherein said predetermined flow direction is orthogonal to an extension direction of the tube profile, wherein said rectangular portion of the cross-section of said tube profile is arranged with the two greater sides thereof along said predetermined flow direction, and with said ogival portion facing an opposite direction to said predetermined flow direction.

16. A tube winding, for a gas condensing heat exchange cell for a boiler for heating an environment, said tube winding being formed by a tube profile wound according to a plurality of turns about a central winding axis, the turns of said plurality being spaced apart from one another according to a direction parallel to the central axis forming calibrated axial passages therebetween, adapted to be crossed, in a radial direction with respect to said central axis, from the central axis towards the exterior of the tube winding, said tube winding defining a central chamber which is radially inside said at least one tube winding and coaxial to said central axis, defining a combustion chamber,
wherein:
said tube profile comprises the features of at least one preceding claim; and wherein
said rectangular portion of the cross-section of said tube profile is arranged with the two greater sides thereof lying on planes orthogonal to the central axis of said tube winding;
said ogival portion of the cross-section of said tube profile faces said central axis.

17. A gas condensing heat exchange cell for a boiler for heating an environment, comprising:
at least one tube winding according to claim 16, adapted to be passed through by a heat transfer fluid;
a container body containing said at least one tube winding therein, said container body being arranged about and outside said at least one tube winding, forming a fume collection chamber arranged radially outside said at least one tube winding and radially interposed between said tube winding and said container body so that the fumes of the combustion which takes place in the combustion chamber can flow from the combustion chamber to the fume collection chamber through said axial space between said turns, lapping said at least one tube winding and transferring an amount of heat to said heat transfer fluid.

* * * * *